United States Patent [19]
Agatone et al.

[11] Patent Number: 5,852,744
[45] Date of Patent: Dec. 22, 1998

[54] METHOD FOR DISCOVERING A NETWORK PRINTER BY ASSIGNING DEDICATED SOCKETS TO DIFFERENT PRINTER TYPES AND POLLING THE DEDICATED SOCKETS TO LEARN THE CORRESPONDING STATE

[75] Inventors: Kevin Agatone, Broomall, Pa.; Roman Orzol, Marlton; Tim Deppa, Cherry Hill, both of N.J.; Jon Hopkins, Brookfield, Wis.; Ponna Arumgam, Medford, N.J.

[73] Assignee: Oki America, Inc., Hackensack, N.J.

[21] Appl. No.: 665,627

[22] Filed: Jun. 18, 1996

Related U.S. Application Data

[60] Provisional application No. 60/001,207 Jul. 14, 1995.
[51] Int. Cl.[6] ................................................... G06F 13/14
[52] U.S. Cl. .......................... 395/837; 395/822; 395/823; 395/835; 395/836; 395/838; 395/839
[58] Field of Search ....................... 340/825.07; 364/200; 370/60; 395/725, 325, 200, 700, 114, 835, 823, 829, 836, 838, 727, 828, 821, 822, 837, 839

[56] References Cited

U.S. PATENT DOCUMENTS

| 4,423,414 | 12/1983 | Bryant et al. ...................... 340/825.07 |
| 4,914,571 | 4/1990 | Baratz et al. ............................ 364/200 |
| 4,941,084 | 7/1990 | Terada et al. ............................ 364/200 |
| 5,136,580 | 8/1992 | Videlock et al. .......................... 370/60 |
| 5,237,693 | 8/1993 | Kiyohara et al. ........................ 395/725 |
| 5,247,620 | 9/1993 | Fukuzawa et al. ...................... 395/325 |
| 5,329,618 | 7/1994 | Moati et al. ............................. 395/200 |
| 5,396,626 | 3/1995 | Nguyen ................................... 395/700 |
| 5,566,278 | 10/1996 | Patel et al. .............................. 395/114 |
| 5,659,795 | 8/1997 | Duvall et al. ............................ 395/835 |

Primary Examiner—Thomas C. Lee
Assistant Examiner—Douglas Rupert
Attorney, Agent, or Firm—Panitch, Schwarze, Jacobs & Nadel, P. C.

[57] ABSTRACT

The present invention discovery of a printer having a particular printer type in a network is disclosed. A socket having a socket identifier (ID)) associated with the printer type is provided to allow communication between the network and the printer. In a socket poll mode, the socket awaits and obtains outgoing data from the network tagged with the socket ID and sends the obtained outgoing data to the printer. In a socket listen mode, the socket awaits and obtains incoming data from the printer and sends the obtained incoming data to the network. A printer information object is provided for storing printer information associated with the printer once the printer is discovered. A timer provides a periodic timing signal TICK. The printer is periodically polled once every N TICKs. During each poll, the socket is placed in the poll mode, polling data is sent to the socket for receipt by the printer, the socket is placed in the listen mode, and a determination is made of whether the socket has obtained printer data from the printer. If printer data is obtained, it is determined whether the printer has been previously discovered based on whether the printer information object has stored printer information for the printer. If not previously discovered, printer information for the printer is created and stored in the printer information object.

6 Claims, 5 Drawing Sheets

METHOD FOR DISCOVERING A NETWORK PRINTER BY ASSIGNING DEDICATED SOCKETS TO DIFFERENT PRINTER TYPES AND POLLING THE DEDICATED SOCKETS TO LEARN THE CORRESPONDING STATE

This application claims the benefit of U.S. Provisional Application No. 60/001,207, filed Jul. 14, 1995.

FIELD OF THE INVENTION

The present invention relates to printer management configuration and control in a computer network environment. More particularly, the present invention relates to locating or "discovering" a printer device on a network, determining and tracking the (status of the discovered printer device, and deciding when the discovered printer device terminates or no longer provides services on the network.

BACKGROUND OF THE INVENTION

For a printer device or printer to be discovered in a computer network environment, the printer must advertise or broadcast its existence. Typically, a service advertising protocol (SAP) is employed in such a broadcast, and a network server running on the network gathers the SAP broadcast and captures the SAP into a network database. Network applications can then peruse the network database when necessary to retrieve the existence of such printer. The network database can also provide information such as the network addressing which is used to directly communicate with the printer. Once the printer is known to the application, the application may retrieve extensive information about the printer.

As is known, generic management protocols may be used in a computer network environment to read and write variables which define a network device such as a printer. One type of management protocol is the Simple Network Management Protocol (SNMP), which uses the Management Information Base (MIB) to define the variables of a device which can be read or written. With such a protocol, an application may bi-directionally communicate with a network device such as a printer.

Communication between network-attached devices is made possible by creating channels, ports, or "sockets", where each socket defines a logical connection between a first device and a second device. As should be understood by one skilled in the art, first and second devices connected by a socket can only communicate with each other by/through the socket. The same description holds true for software tasks which are communicating with each other through the network media. Tasks connected on a socket are guaranteed to send signals or messages to each other.

Messages are streams of data which are packetized in such a way that the message ends up at the right destination task and each end of the socket can decipher the information or data which is trying to be communicated. The packetized information contains identifiers and indexes which may change the state of the communication channel.

As one skilled in the art should recognize, object-oriented analysis and design (OOA&D) is an approach for classifying and describing interactions between object components, and then encapsulating and modeling such object components. Classifications are defined by generalizing object components. Object components are identified by recognizing characterizations and functions which behave as individual entities and have unique behavior and descriptive attributes. In the invention to be described below, a set of classifications, object components, and interactions between object components are defined. As seen in the drawings, the OOA&D for the present invention may be fully described though the use of classification and object component diagrams.

OOA&D object technology, object analysis, design theory, and terminology is discussed in detail in *Object-Oriented Analysis and Design with Applications*, Grady Booch, [Redwood City, Calif.: Benjamin/Cummings, 1993], hereby incorporated by reference. Because object designs build on each other (i.e. new objects are generally built from older objects), several class libraries are available for starting a new analysis and design. The object design of the present invention builds on the Rogue Wave Foundation Class Libraries, TOOLS.H++. As should be understood, TOOLS.H++ has classifications for objects such as strings, multi-byte strings, localized time and date, hash (sets, binary trees, dictionaries, sorted lists, linked lists, etc.

The model-view-controller (MVC) architecture is a useful architectures used by OOA&D applications. The MVC is essentially a trinity of objects and classifications which facilitates the physical data collection (model), the expression or composition of the data presentation (view), and the interaction or interface between the presentation and the user or outside influence (controller).

Models are the physical data collection or content of the physical devices and the behavior or the devices as described by the system make up the objects. Each model keeps track of the raw data which may or may not be understandable to the user or outside influence. Views are the objects which interact directly with the models and whose primary purpose is to shape or present the model raw data. Each model may contain several view instances and each view may only exist for one model.

Each view instance may present the model in different ways or may only present sections or subsections or information about the model. The view can also write information into the model as raw data. In the implementation of the MVC, raw information is periodically collected by the model if at least one view exists for such model. A reference is registered with a model for every view created for the model. When a view is destroyed, the respective reference is released by the respective model.

The models and views are manipulated and processed with the actions of controller objects (also referred to as user interface objects). The controller objects cause methods of a view to be invoked which in turn may cause reactions in a related model. Accordingly, controller objects tend to cause the MVC architecture to be highly event-driven. Therefore, event-driven operating systems such as the MICROSOFT WINDOWS operating system from MICROSOFT Corporation allow for a clean existence of an MVC architecture.

In the invention to be described below, a method to discover the existence of a printer and the status of the printer with a minimum amount of steps and network traffic is disclosed. The method utilizes a network broadcast message over a dedicated socket. The dedicated socket is either registered with the network community or is acquired from the network operating system as a temporarily assigned socket which does not conflict with any existing sockets. The protocol used in the broadcast response contains the printer status information. The printer status information is maintained in a component object which models the actual printer device. A device model is used in the present invention to encapsulate the task to task communication state information and to provide a virtual communication channel between the application and device.

SUMMARY OF THE INVENTION

Briefly stated, the present invention relates to discovering a printer having a particular printer type in a network. A socket having a socket identifier (ID) associated with the printer type is established by a network, and the network communicates with the printer through the socket. The socket has a poll mode and a listen mode. In the poll mode, the socket awaits and obtains outgoing data from the network tagged with the socket ID, and sends the obtained outgoing data to the printer. In the listen mode, the socket awaits and obtains incoming data from the printer and sends the obtained incoming data to the network.

The network establishes a printer information object for storing printer information associated with the printer once the printer is discovered. The network maintains and updates the printer information with the printer information object. Additionally, the network establishes a timer that provides a periodic timing signal TICK.

The printer is periodically polled once every N TICKs. Each poll includes placing the socket in the poll mode, sending polling data tagged with the socket ID to the socket for receipt by the printer, placing the socket in the listen mode, and waiting to determine whether the socket has obtained printer data from the printer.

If the socket has obtained printer data from the printer, the network determines from the printer information object whether the printer has been previously discovered based on whether the printer information object has stored printer information for the printer. If the printer has not been previously discovered, printer information for the printer is created and stored in the printer information object.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements, configurations and instrumentalities shown. In the drawings.

DETAILED DESCRIPTION OF PREFERRED EMBODIMENTS

The preferred embodiment of the present invention is generated in a computer network environment to configure and control network printing devices. The preferred embodiment is described in terms of classifications that are discovered. For many of the classifications, a description of the responsibilities and collaborations is provided. Methods needed for descriptive purposes are listed where necessary for understanding the classification. Not all classifications which make up the final implementation of the preferred embodiment are described here, since some exist from outside class libraries, such as the RogueWave TOOLS.H++ class library, and some exist as instantiated classifications or parameterized classes which behavior is self evident.

Figure 1:
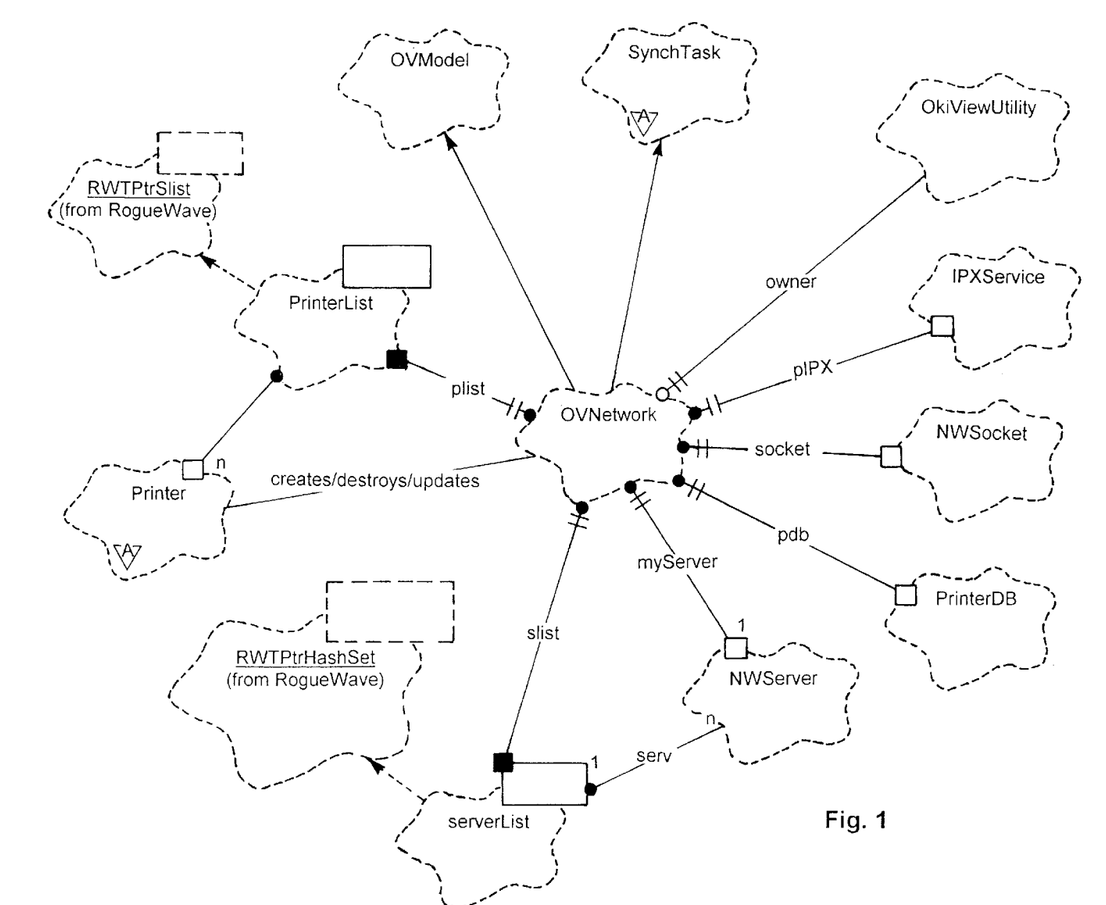
FIG. 1 is an OOA&D classification diagram showing network class relationships in accordance with the preferred embodiment for the present invention.

Referring now to the drawings in detail, there is shown in FIG. 1 a network classification scheme in accordance with a preferred embodiment of the present invention. In describing FIG. 1 and all other objectoriented diagrams, the Grady Booch Object-Oriented Analysis and Design (OOA&D) methodology is used. One having ordinary skill in the art of OOA&D will recognize and understand the terminology and the symbols used below and in the drawings. Some of the class and object names use the OVxxx prefix in order to be distinguished from other similarly named objects. Of course, one skilled in the art will recognize that the names are not intended to be limiting, and that virtually any names may be employed without departing from the spirit and scope of the present invention. The classes as they appear in FIG. 1 and their relationships will now be discussed.

OVModel

The base class model for the OkiView MVC design, which describes the base OkiView modeling schema. Such schema is very similar to the MVC architecture which is evident in a large majority of Object-Oriented designs.

Responsibilities

1. Maintains relations between model and view (OVView, described below) for updating information.
2. Maintains a list of views which are constructed to access the model, including registering and removing views from the list.
3. Provides a synchronous method 'scan' for updating model state and information. 'Scan' provides a mechanism for inhibiting the update if no views are currently registered.

Collaborations

1. Accesses the OVView method 'update' when the model detects that there has been a change in content or state.

OVView (not shown)

The base class view for the OkiView MVC design.

Responsibilities

1. Maintains relations between the view and the model monitored by the view.
2. Maintains a list of child views constructed as parts of the overall view. Each child view may have a different model from the parent view.
3. Updates any existing parent view when new information is available.
4. Provides the method 'update' for allowing new information from the model to be displayed.
5. Provides a method 'retire' that the model may invoke when being destroyed.

Collaborations

1. A parent view works with existing child views to notify each other when new information is available.

Figure 5:
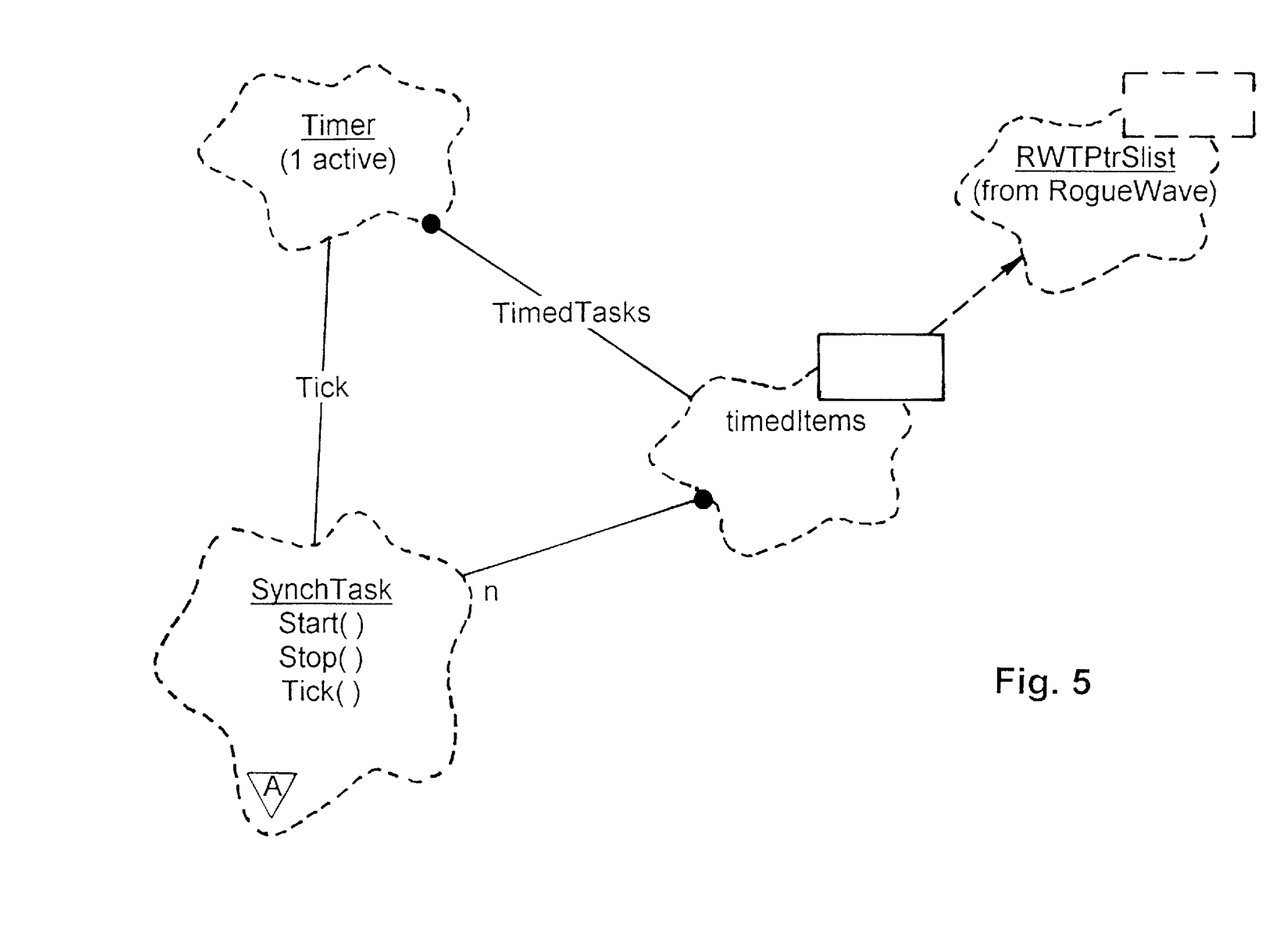
FIG. 5 is an OOA&D classification diagram showing the timer class relationships in accordance with the preferred embodiment of the present invention.

Timer (not shown in FIG. 1, shown in FIG. 5)

This class describes an object with the ability to 'wake up' periodically, and contains a list of objects of type SynchTask. The Timer interfaces with the operating system and provides a means for callback into a Timer method. The callback traverses the list of SynchTask objects and invokes the 'TICK' method of each. A SynchTask is registered with the Timer (i.e. store a SynchTask reference in the Timer list) during the construction of a SynchTask object. The reference is cleared during the destruction of the Synchtask object.

Responsibilities

1. Wakes up at a periodic time interval which is set when the Timer is started.
2. Maintains a list of tasks of type SynchTask. A SynchTask provides a method called TICK called by Timer during the wake up period.
3. Provides methods to start and stop the Timer.

Collaborations

1. Maintains references to all registered SynchTask objects to invoke the TICK method.

SynchTask

This class describes a task which is capable of periodically waking up and performing a single function called TICK. Any class which inherits this capability provides the TICK function. The SynchTask object is registered with the Timer class. The Timer class creates a single instance object which knows how to utilize timers within the operating system.

Responsibilities

1. Provides a virtual method TICK which derived classes may define to process information which must be accessed at regular intervals.
2. Provides methods to start and stop the periodic update intervals.

Collaborations

1. Maintains a reference to the Timer to allow for the addition and removal of a SynchTask object from the Timer lists.

OkiViewUtility

This class defines ownership of all other classes. As should be understood, 'ownership' is a convenient device for an application developer since it is easier to cause an instance of an object or type OkiViewUtility than it is to create instances of all the individual classes which make up the system and store their existence within the application.

Responsibilities

1. Maintains the aggregation of objects Timer and OVNetwork. Many other objects are contained as aggregations of Timer and OVNetwork.
2. Encapsulates the interface to the operating environment for accessing preference information for the operation of the objects.

Collaborations

1. Maintains a reference to Timer for purposes of creating and destroying objects.
2. Maintains a reference to OVNetwork for purposes of creating, initializing, and destroying objects.

OVNetwork

This class contains the aggregation of all the primary classes which make up the network services, and is responsible for the creation and destruction of all such aggregate objects. OVNetwork is multiply inherited from OVModel and SynchTask. OVModel allows OVNetwork to update view classes (OVView) and maintains model behaviors. SynchTask allows OVNetwork to periodically uncover new information about the network and allows at least some of the aggregate objects to uncover their own new information. The updated information is done intelligently in that no formal operation is performed by the OVNetwork or any aggregate if there are no views registered with the model. OVModel provides the active list of registered views. An application developer may send messages to OVNetwork directly, or may request OVNetwork to send messages to an aggregate object if needed.

Responsibilities

1. Creates IPXService to initialize access to the network API.
2. Maintains a list of NetWare server objects which are of type NWServer.
3. Encapsulates the mechanisms from the network API for updating the list of NetWare servers currently providing services on the network.
4. Maintains a socket connection for communicating between the application and printer devices.
5. Provides a means to find new printer devices which exist on the network and are responsive to the predefined socket connection. This occurs during the TICK method provided by OVNetwork.
6. Provides a means to allow servers to scan for new state information. This occurs during the TICK method provided by OVNetwork.
7. Maintains a list of printer devices found on the network.

Collaborations

1. Maintains a reference to OkiViewUtility to access preference information.
2. Maintains a reference to IPXService to access information about client station network API parameters.
3. Maintains a reference to the socket created to access information from the printer devices.

IPXService

This class provides IPX binding, initialization, and closure for the NetWare IPX API. This is an encapsulation of NetWare API function calls. Without any additional steps required by the application developer, the instantiation of IPXService provides all the necessary manipulations of the client station to start communication with the Network environment and other network devices. If need be, the application developer may then refer to IPXService for handles and other references of the client workstation and the network environment. Since the IPXService class is responsible for initializing the NetWare API, it is a single instance object. IPXService also contains a private list of IPX sockets. IPXService keeps a reference to every IPX socket, NWSocket, created by the application. If the application destroys the socket, the reference is removed from the IPXService list. If the application forgets to destroy the socket and the application is closed, IPXService forces the destruction of any open sockets found in its list. Such a safety feature makes the class libraries more reliable since if a socket is not closed after an application ceases to exist, unknown socket communications may render the client station useless.

Responsibilities

1. Initializes the NetWare API.
2. Binds the application to the API and retrieves the application task handle.
3. Cleans up the NetWare API during application termination and ensures that all NWSockets are destroyed appropriately.
4. Maintains a list of sockets open for an application.
5. Maintains the NetWare shell configuration.
6. Maintains the NetWare state.

Collaborations

Figure 2:
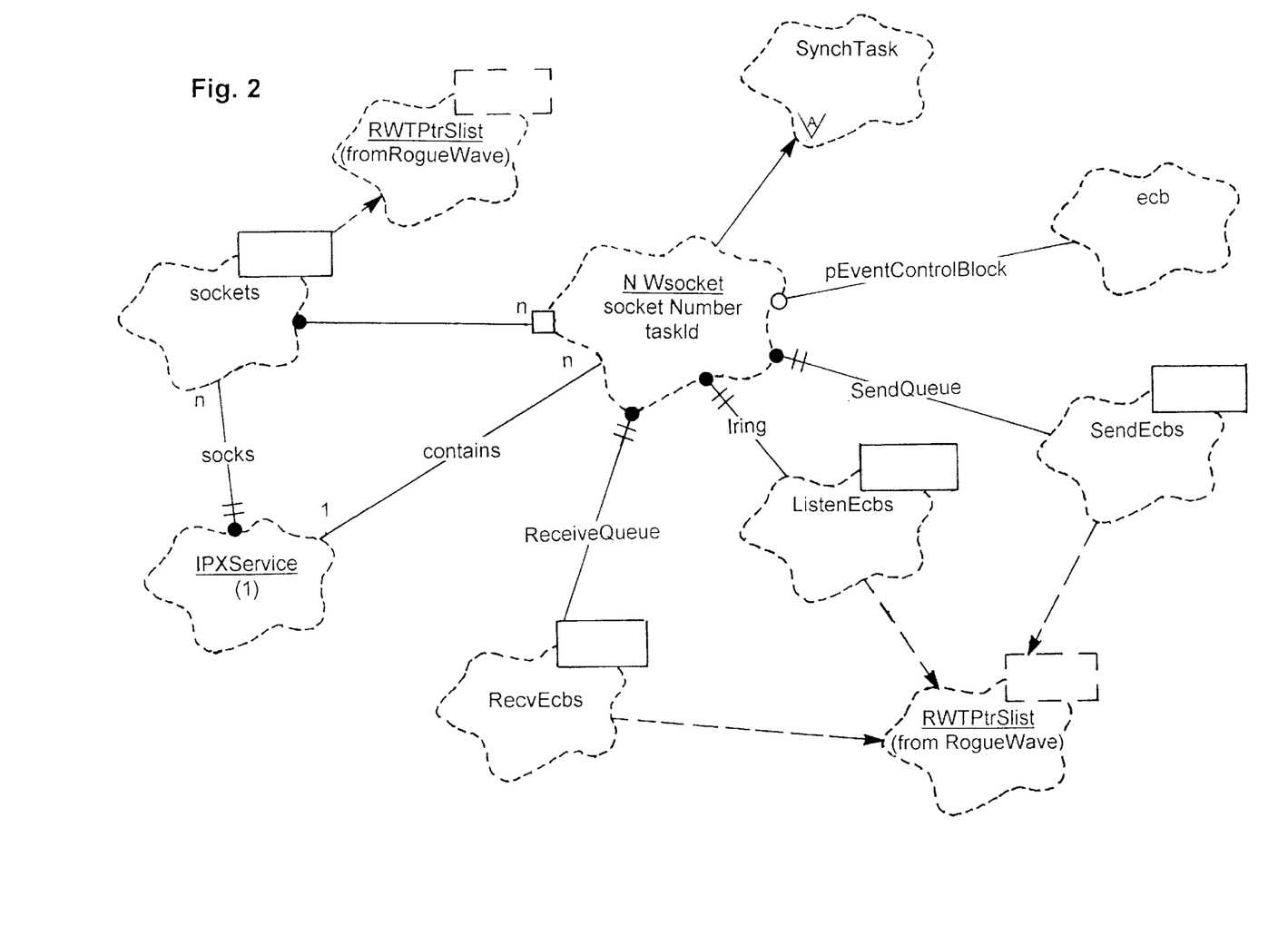
FIG. 2 is an OOA&D classification diagram showing the relationships of the network socket in accordance with the preferred embodiment of the present invention.

1. Maintains a reference to each NWSocket to ensure that all appropriate NetWare sockets are destroyed before an application terminates.

ecb (not shown in FIG. 1, shown in FIG. 2)

This is the class form of the ECB (Event Control Block) structure, which is the mechanism used for communicating data buffers to the NetWare API, and which is defined by the API.

Responsibilities

1. Initializes the header and data buffers.
2. Provides convenient access to data buffers and ECB state information.
3. Manipulates ECB data members.
4. Creates and destroys the physical transmit and receive data buffers.

Collaborations

1. This class is publicly derived from the ECB structure.

NWSocket

This class is the encapsulation of IPX service socket API function calls. Such sockets are used to create communication channels between a client workstation and another network device capable of recognizing the socket identifier. An NWSocket is created with a unique identifier or ID (SocketNumber) and stores as data members the information needed to communicate. IPXService provides a taskId identification to give an application a hook into the NetWare socket interface. NWSocket contains aggregate objects which manage the transmission and reception of network data packet buffers. NWSocket is inherited from SynchTask and provides a TICK function which polls the API interface for received data packet buffer and re-sends data packet buffers which fail. The data packet buffers are described by the ECB structure.

Responsibilities

1. Creates a socket using the necessary API function calls.
2. Provides necessary listen buffers to receive data packets off the network. The listen buffers are kept in a list maintained by NWSocket.
3. Determines whether an ecb has received data. The ecb gets placed on a receive list. The list is accessed by an application when it is ready to process new data.
4. Allows transmission of data packets onto the network. The necessary API function calls are used to provide this responsibility.
5. Provides assistance for formatting ecb objects used for transmitting and receiving.
6. Determines a local address for a client station.

Collaborations

1. Maintains a reference to IPXService for accessing client workstations specific to information.
2. Accesses ecb methods to determine when data is processed during a transmit, receive, or error condition.
3. Registers a reference to itself to IPXService.

NWServer

This class represents an actual NetWare Server. Information regarding handles to the server, server type, server version, etc. is retrieved and stored by the NWServer object when created. NWServer stores actual user lists and attachment information. If an application has a physical attachment to a server, the NWServer creates an NWAttachment which represents all attachment information. An application may also create NWAttachment for NWServer which causes the client station to physically log in to the NetWare server. NWServer also contains the list of print queues (NWQueue), print servers (NWPrintServer), and remote printers (NWPrinters) managed by the NetWare Server. An application can create, destroy, or modify each of these objects which in turn causes the appropriate API calls. NWServer also inherits OVModel, and can smartly update information on a periodic basis. The OVNetwork TICK function calls all NWServers found on the network. Physical API calls for updating information are made only if NWServer has registered views.

Responsibilities

1. Maintains information on the connection type.
2. Creates and maintains an attachment, NWAttachment, from a workstation to the physical NetWare server, if necessary.
3. Retrieves server version information.
4. Retrieves privilege information from attachment.
5. Retrieves all user and group information defined for the NetWare server and collects information into a list.
6. Retrieves all queues, NWQueue, defined on the NetWare server and collects queues into a list, which is updated during the TICK period of OVNetwork.
7. Creates and destroys NWQueue objects as required.
8. Allows an application to access the NWQueue objects stored in the lists.
9. Retrieves all print servers, NWPrintServer, defined on the NetWare server and collects print servers into a list. The list is updated during the TICK period of OvNetwork.
10. Creates and destroys NWPrintServer objects as required.
11. Allows an application to access the NWPrintServer objects stored in the lists.

Collaborations

1. If an application is currently logged into a NetWare server, a reference is kept to an NWAttachment object. The application may also log into and out of the server by created or destroying the NWAttachment.

serverList

This instantiated class contains a list of all NWServer objects which are discovered by the OVNetwork. The list is derived from a parameterized class which behaves like a hash set. The serverList is traversed by OVNetwork during TICK to provide each NWServer the opportunity to update its corresponding information.

Printer

This class encapsulates all transactions between a client workstation and a printer device residing on the network. An application obtains information on a printer device directly from the corresponding Printer object, and changes printer device settings by accessing the Printer object. OVNetwork discovers a new printer device and creates a corresponding Printer object during the TICK function. OVNetwork also determines if printer devices disappear during the TICK time period. OVNetwork creating an NWSocket to facilitate communications between the Printer object and the physical printer device. The Printer class also inherits OVModel allowing it to retrieve information periodically and smartly, i.e. only if a view exists.

Responsibilities

1. Maintains all statistics and state information regarding the physical printer device.
2. Monitors and controls the NetWare print server capability of the physical printer device.
3. Maintains all configuration information regarding the network interface of the physical printer object.

4. Determines whether a received printer packet is from an existing printer or a new printer. If the packet belongs to a new printer, OVNetwork is notified and a new Printer object is created.
5. Creates data packets for NWSocket to transmit to the printer or printers.
6. Determines, when called for by OvNetwork, whether a significant amount of time has lapsed for the data in the Printer to remain valid. The Printer object is destroyed if the data is no longer valid.

Collaborations
1. Works with OVNetwork to determine the existence of new printers and to destroy printers which no longer respond.
2. Works with NWSocket to receive and transmit data packets to and from the physical printer device.

printerList

This instantiated class contains a list of all Printer objects discovered by OVNetwork. OVNetwork uses the list to allow updates during its TICK time period and provides the list to any view object. The list is derived from a parameterized class which behaves as a singly-linked list.

PrinterDB

This class is a database holding area for nonvolatile information generated for past existing printer devices. Reference is made to PrinterDB for possible information needed during creation of a new Printer object.

Responsibilities
1. Maintains all non-volatile printer configuration information. Such information includes a printer description, administrator notes, print driver distribution, and a printer location description.
2. Allows such information to be distributed to PrinterDB objects which may exist in remote applications on the network.

Collaborations
1. Works with the Printer object to determine if new information needs to be retrieved and/or saved.

FIG. 2 outlines the socket implementation implemented by the preferred embodiment of the present invention. In describing this diagram the Grady Booch Object-Oriented Analysis and Design methodology is used. The classes as they appear in FIG. 2 and their relationships will now be discussed.

NWSocket

As was discussed above, this class encapsulates the socket communication between a client workstation and a network device. The socketNumber provides the unique identification needed to create the object. The taskid is the identification provided by IPXService to give an application a hook into the NetWare socket interface. NWSocket provides a TICK function which polls the API interface for received data packet buffers and re-sends data packet buffers which fail.

IPXService

As was discussed above, this class is a single instance object which maintains the IPIX status with a client workstation. IPXService maintains a list of all existing sockets so that cleanup can occur in a safe manner.

sockets

This is the instantiated class list of NWSocket contained by IPXService. The sockets class is derived from a parameterized class which behaves like a singly-linked list.

ecb

As was discussed above, this is the classification form of the ECB structure. The ecb class is responsible for the manipulation of ECB data members and the creation and destruction of the physical transmit and receive data buffers.

SendEcbs

This is the instantiated class list of ecb objects which have been sent. The status of each sent object is checked periodically during TICK. If a status check indicates failure, the failed sent object is resent. If a status check indicates success, the successful sent object is destroyed or returned to an owner if one exists. SendEcbs is derived from a parameterized class which behaves like a singly-linked list.

ListenEcbs

This is the instantiated class list of ecb objects which are awaiting the arrival of new data packets from the network. Each listen ecb is checked for received data during TICK. If data is received, the listen ecb is sent to the RecvEcbs list (discussed below) and a new ecb is created to take its place in the ListenEcbs list. ListenEcbs is derived from a parameterized class which behaves like a singly-linked list.

RecvEcbs

This is the instantiated class list of ecb objects which have received data from the network. OVNetwork polls RecvEcbs during TICK and acts upon the data received. RecvEcbs is derived from a parameterized class which behaves like a singly-linked list.

Figure 3:
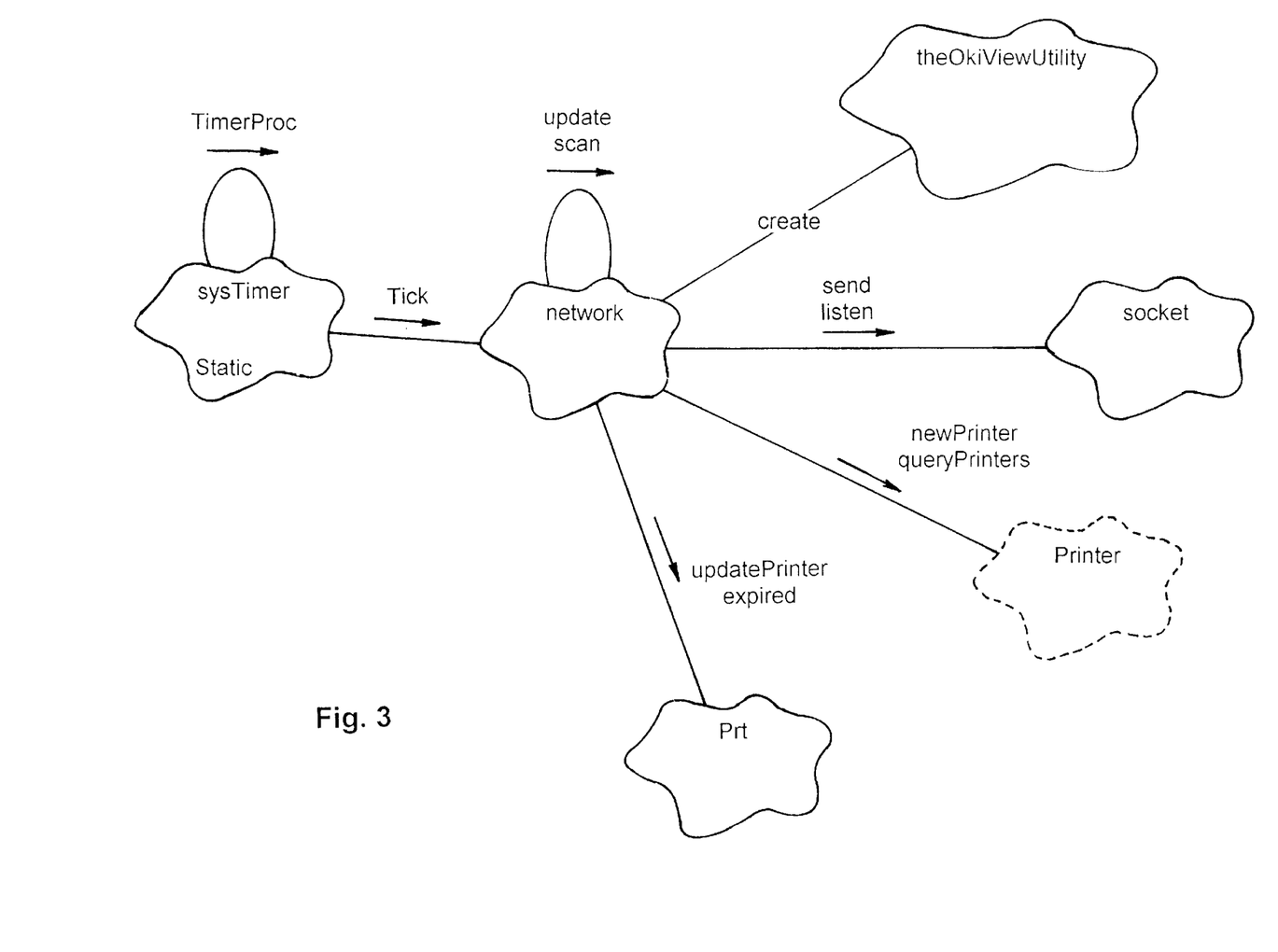
FIG. 3 is an OOA&D interaction diagram showing the process for finding printer information and updating printer status in accordance with the preferred embodiment of the present invention.

FIG. 3 shows the interaction among objects for finding information and updating the printer status. This occurs during the OVNetwork TICK period. The 'network' object is the instantiation of the OVNetwork. As shown, the Timer object 'sysTimer' invokes the OVNetwork TICK method. The 'network' object attempts to uncover new printers and update the current printer information.

This is accomplished during one TICK period by invoking the Printer class static method 'queryPrinter'. Such method causes Printer to construct and broadcast a polling message over a predefined network socket. Responses to such broadcast are checked during another TICK period. If 'network' determines that the previous TICK period has issued a broadcast, the next several TICK periods are dedicated to gathering the printer responses from the network. The 'network' object retrieves the new data packets via the NWSocket object 'socket'.

The 'Prt' object is an instantiation of a Printer class which has local visibility and exists only during the TICK period. As shown in connection with FIG. 1, the list of printers is kept by the OVNetwork 'plist'. Each printer is retrieved one at a time from the 'plist' and stored temporarily into 'Prt'. Each newly arrived data packet is given to the 'Printer' object using 'updatePrinter'. It is the responsibility of the 'Printer' object to determine whether the newly arrived data is destined for itself. If not, the data packet is rejected and CVNetwork proceeds to the next Printer object found in 'plist'.

If no Printer object claims the data packet, the class static method 'newPrinter' is invoked. The 'Printer' object then determines whether 'newPrinter' originated from a printer which just appeared on the network. If so, OVNetwork creates a new 'Printer' object for the new printer and places the new 'Printer' object into the 'plist'.

To determine whether a printer device has disappeared, OVNetwork ascertains whether a corresponding 'Printer' object contains data that is no longer valid. That is 'network' retrieves each 'Printer' object from the 'plist' and the method 'expired' is called. The 'Printer' object has the responsibility to determine whether the Printer data has expired. If so, 'network' destroys the Printer object.

Figure 4:
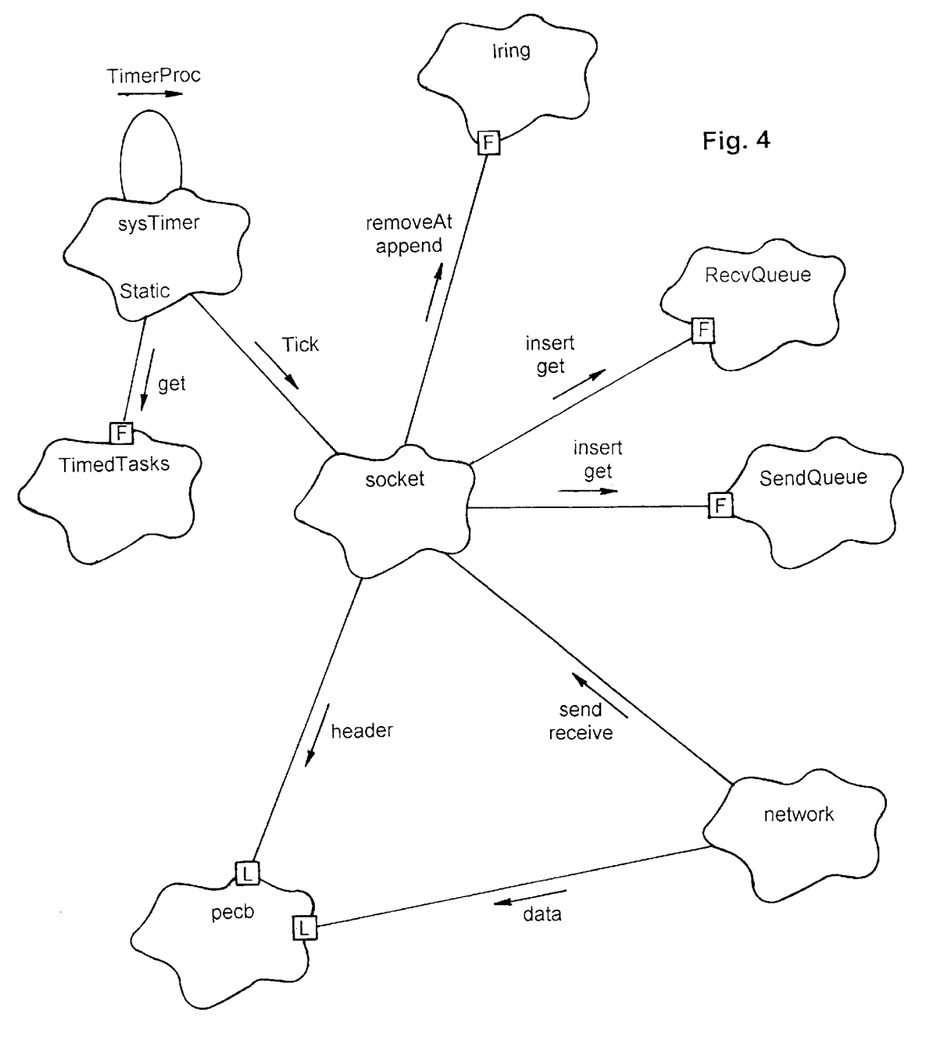
FIG. 4 is an OOA&D interaction diagram showing the process for maintaining communications through the network socket in accordance with the preferred embodiment of the present invention.

FIG. 4 shows the interaction among objects for maintaining the communication channels through the network sockets. The object 'socket' is the instantiation of NWSocket. As shown, the Timer object 'sysTimer' invokes the NWSocket TICK method. The 'socket' object then checks each ecb entry found in the ListenEcbs object 'Lring'. As should be understood, each ecb entry in 'Lring' is waiting for a new message from the network.

The 'socket' then creates an ecb object 'pecb' which has local visibility to 'socket' and holds each probed ecb object found in 'Lring'. If 'pecb' has received new information off the network, the relevant ecb object is added to the RecvEcbs object 'RecvQueue'. It is the responsibility of the OVNetwork object 'network' to retrieve the ecb objects from the 'RecvQueue' when the network is ready to access the new network information. The application accesses new data through the NWSocket method 'receive'.

Next, 'socket' checks for any ecb objects which exist in the SendEcbs object 'SendQueue'. The ecb object is created by an application and then submitted to 'SendQueue' through the NWSocket method 'send'. The ecb object is stored locally in pecb. If the ecb object is to be sent, the appropriate API calls are made. If the ecb object shows that is has been sent but is currently in an error state, an error condition is stored and the ecb object is destroyed.

FIG. 5 outlines the classification implementation used for Timer and SynchTask in the preferred embodiment of the present invention and shows how the Timer object keeps a list of SynchTask type objects. As explained, these tasks are responsible for the synchronous behavior of the MVC.

Timer

As was discussed above, this class describes an object with the ability to wake up periodically. This class contains a list of objects of type SynchTask. The Timer interfaces with the operating system and provides a means for callback into a Timer method. This callback traverses the list of SynchTask objects and invokes the TICK method of each. A SynchTask object is registered with the Timer, i.e. stored in the list, during the construction of a SynchTask object. The registered object is cleared during the destruction of the SynchTask object.

SynchTask

As was discussed above, this class describes a task which is capable of periodically waking up and performing a single function called TICK. Any class which inherits this capability provides the TICK function.

timedItems

This is the instantiated class list of SynchTask objects which provide a TICK process for the Timer to invoke during a wake-up period. This class is derived from a parameterized class which behaves like a singly-linked list.

With the architecture described above, a printer having a particular printer type in a network is discovered in the following manner. Preliminarily, a socket having a socket identifier (ID) associated with the printer type is established by a network, and the network communicates with the printer through the socket. As should now be understood, the socket has a poll mode and a listen mode. In the poll mode, the socket awaits and obtains outgoing data from the network tagged with the socket ID, and sends the obtained outgoing data to the printer. In the listen mode, the socket awaits and obtains incoming data from the printer and sends the obtained incoming data to the network.

The network also establishes a printer information object for storing printer information associated with the printer once the printer is discovered. As should now be understood, the network maintains and updates the printer information with the printer information object. Additionally, the network establishes a timer that provides a periodic timing signal TICK.

The printer is then periodically polled once every N TICKs. Each poll includes placing the socket in the poll mode, sending polling data tagged with the socket ID to the socket for receipt by the printer, placing the socket in the listen mode, and waiting to determine whether the socket has obtained printer data from the printer.

If the socket has obtained printer data from the printer, the network determines from the printer information object whether the printer has been previously discovered based on whether the printer information object has stored printer information for the printer. If the printer has not been previously discovered, printer information for the printer is created and stored in the printer information object.

Preferably, the creation of the printer information includes the creation of a printer model object for the printer, the creation of actual printer information relevant to the printer, and the storage of the created printer information in the printer model object.

Preferably, the actual printer information in the printer model object includes an aging counter which is incremented during each poll if the socket has not obtained printer data from the printer. However, if the socket has obtained printer data from the printer, the aging counter is zeroed. Accordingly, it may be determined whether the aging counter has reached a predetermined level, and the printer model object for the printer can be destroyed if the aging counter has reached the predetermined level. As should be understood, such determination may occur at an interval of once each poll or at longer intervals.

Preferably, the printer information in the printer information object includes stored printer status information relating to a stored status of the printer, and the printer data from the printer includes current printer status information relating to a current status of the printer. Accordingly, if the printer has been previously discovered the stored printer status information may be compared with the current printer status information to determine whether the current status of the printer differs from the stored status of the printer, and if the current status differs from the stored status, the stored printer status information in the printer information object may be replaced with the current printer status information. More preferably, if the current status differs from the stored status, an application viewing the printer model object is notified that the current status has changed.

With the architecture and the method for discovering and aging a printer in a network as was discussed above, network printers may be monitored and controlled in an object-oriented manner. It will be appreciated by those skilled in the art that changes could be made to the embodiments described above without departing from the broad inventive concepts thereof. It is understood, therefore, that this invention is not limited to the particular embodiment disclosed, but: it is intended to cover modifications within the spirit and scope of the present invention as defined by the appended claims.

We claim:

1. A method for discovering a printer of a printer type in a network, the method comprising the steps of:

establishing a socket having a socket identifier (ID) associated with the printer type, the network communicating with the printer through the socket, the socket having a poll mode and a listen mode, the socket when in the poll mode awaiting and obtaining outgoing data from the network tagged with the socket ID and sending the obtained outgoing data to the printer, the socket when in the listen mode awaiting and obtaining incoming data from the printer and sending the obtained incoming data to the network;

establishing a printer information object for storing printer information associated with the printer once the printer is discovered, the network maintaining and updating the printer information therewith;

establishing a timer providing a periodic timing signal TICK;

periodically polling for the printer once every N TICKs, each polling step comprising the steps of:

placing the socket in the poll mode;

sending polling data tagged with the socket ID to the socket for receipt by the printer;

placing the socket in the listen mode; and waiting to determine whether the socket has obtained printer data from the printer;

if the socket has obtained printer data from the printer, determining from the printer information object whether the printer has been previously discovered based on whether the printer information object has stored printer information for the printer; and if the printer has not been previously discovered, creating printer information for the printer and storing the created printer information in the printer information object.

2. The method of claim 1 wherein the creating printer information step comprises the steps of creating a printer model object for the printer, creating printer information for the printer, and storing the created printer information in the printer model object.

3. The method of claim 2 wherein the printer information in the printer model object includes an aging counter, the polling step further comprising the steps of:

incrementing the aging counter if the socket has not obtained printer data from the printer; and zeroing the aging counter if the socket has obtained printer data from the printer; the method further comprising the steps of:

determining whether the aging counter has reached a predetermined level; and destroying the printer model object for the printer if the aging counter has reached the predetermined level.

4. The method of claim 2 wherein the printer information in the printer model object includes an aging counter, the polling step further comprising the steps of:

incrementing the aging counter if the socket has not obtained printer data from the printer;

zeroing the aging counter if the socket has obtained printer data from the printer;

determining whether the aging counter has reached a predetermined level; and destroying the printer model object for the printer if the aging counter has reached the predetermined level.

5. The method of claim 1 wherein the printer information in the printer information object includes stored printer status information relating to a stored status of the printer and wherein the printer data from the printer includes current printer status information relating to a current status of the printer, the method further comprising the steps of:

if the printer has been previously discovered:

comparing the stored printer status information with the current printer status information to determine whether the current status of the printer differs from the stored status of the printer; and if the current status differs from the stored status, replacing the stored printer status information in the printer information object with the current printer status information.

6. The method of claim 5 wherein an application is viewing the printer model object for the printer, the method further comprising the step of notifying the application that the current status has changed if the current status differs from the stored status.

* * * * *